United States Patent
Randell et al.

(10) Patent No.: US 7,314,681 B2
(45) Date of Patent: Jan. 1, 2008

(54) CYLINDRICAL ALKALINE CELLS WITH INCREASED DISCHARGE PERFORMANCE

(75) Inventors: Christopher Fred Randell, Newton Hall (GB); Richard A. Langan, Parma, OH (US)

(73) Assignee: Eveready Battery Company, Inc., St. Louis, MO (US)

( * ) Notice: Subject to any disclaimer, the term of this patent is extended or adjusted under 35 U.S.C. 154(b) by 699 days.

(21) Appl. No.: 10/504,353

(22) PCT Filed: Feb. 13, 2003

(86) PCT No.: PCT/US03/04640

§ 371 (c)(1),
(2), (4) Date: Aug. 12, 2004

(87) PCT Pub. No.: WO03/071653

PCT Pub. Date: Aug. 28, 2003

(65) Prior Publication Data

US 2005/0079410 A1  Apr. 14, 2005

(30) Foreign Application Priority Data

Feb. 15, 2002 (GB) ................ 0203703.4

(51) Int. Cl.
*H01M 10/24* (2006.01)
*H01M 10/28* (2006.01)

(52) U.S. Cl. ............ 429/164; 429/224; 429/229; 429/206

(58) Field of Classification Search .......... None
See application file for complete search history.

(56) References Cited

U.S. PATENT DOCUMENTS

| 3,335,031 | A | 8/1967 | Kordesch |
| 5,283,139 | A | 2/1994 | Newman et al. ............ 429/224 |
| 5,336,571 | A | 8/1994 | Tomantschger et al. ...... 429/66 |
| 5,364,715 | A | 11/1994 | Getz et al. |
| 5,532,078 | A | 7/1996 | Redey et al. ................ 429/104 |
| 5,677,080 | A | 10/1997 | Chen .......................... 429/167 |
| 5,869,205 | A | 2/1999 | Mick et al. .................. 429/164 |
| 6,074,781 | A | 6/2000 | Jurca .......................... 429/209 |
| 6,126,704 | A | 10/2000 | Gardner ..................... 29/623.1 |
| 6,143,446 | A | 11/2000 | Davis et al. ................ 429/224 |
| 6,265,101 | B1 | 7/2001 | Tucholski ................... 429/163 |

(Continued)

FOREIGN PATENT DOCUMENTS

GB  2 231 196 A  7/1990

(Continued)

OTHER PUBLICATIONS

Linden, David, "Factors Affecting Battery Performance," *Handbook of Batteries*, McGraw-Hill, Inc., Chapter 3, pp. 3.2-3.20.

*Primary Examiner*—Susy Tsang-Foster
*Assistant Examiner*—Cynthia Lee
(74) *Attorney, Agent, or Firm*—Russell H. Toye, Jr.

(57) ABSTRACT

An alkaline battery cell with increased discharge capacity is provided. Both the internal volume and the electrode interfacial surface area are increased, without unnecessarily increasing the overall cell volume, by increasing the height but not the diameter of the electrodes, thereby avoiding an unnecessary increase in the total cell volume.

19 Claims, 3 Drawing Sheets

U.S. PATENT DOCUMENTS

| | | | |
|---|---|---|---|
| 6,326,102 B1 | 12/2001 | Getz | 429/132 |
| 6,342,317 B1 | 1/2002 | Patel et al. | 429/176 |
| 6,482,543 B1 | 11/2002 | Shelekhin et al. | 429/164 |
| 6,495,284 B2 | 12/2002 | Sargeant et al. | 429/174 |
| 2002/0160251 A1 | 10/2002 | Chang et al. | 429/42 |
| 2003/0170537 A1 | 9/2003 | Randell | |

FOREIGN PATENT DOCUMENTS

| | | |
|---|---|---|
| WO | WO 2000/36667 A | 6/2000 |

CYLINDRICAL ALKALINE CELLS WITH INCREASED DISCHARGE PERFORMANCE

BACKGROUND

The present invention generally relates to cylindrical alkaline zinc/manganese dioxide electrochemical cell batteries.

Cylindrical alkaline zinc/manganese dioxide batteries are popular sources of power for portable devices used by consumers. They are readily available, highly reliable and provide good shelf life and discharge characteristics at a reasonable cost.

Portable devices are increasingly requiring higher rate output (current and power) capability, as well as increasingly longer discharge times from the batteries that power the devices. At the same time, the trend is toward more compact devices, hence smaller batteries.

One way to achieve higher rate output as well increase discharge times is to improve battery discharge efficiency. Batteries are able to deliver only a fraction of their theoretical capacity, and, in general, that fraction (the discharge efficiency) decreases as the discharge rate increases. One factor that can affect the discharge efficiency of a battery is the interfacial surface area between the electrodes in the battery's cell(s). Increasing the interfacial surface area generally has positive effects on current density, internal resistance, concentration polarization, and other characteristics that can effect discharge efficiency. Accordingly, the current, power and discharge capacity of alkaline batteries can be increased by increasing the interfacial surface area between the anodes and cathodes.

Typical consumer cylindrical alkaline $Zn/MnO_2$ battery cells have a bobbin-type construction, with coaxially disposed electrodes. The positive electrode (cathode) has essentially a hollow cylindrical shape with a smooth, round internal surface disposed next to the cell container's sides. A negative electrode (anode) is disposed within the hollow cavity in the cathode, with a separator between the opposing anode and cathode surfaces (i.e., in the electrode interface). The area of that interface is the interfacial surface area, which can be approximated by measuring the area of the inner surface of the hollow cathode cylinder.

There have been previous attempts to improve the high power capability and/or the high rate discharge capacity of alkaline batteries by increasing electrode interfacial area. Examples can be found in U.S. Pat. No. 3,335,031, U.S. Pat. No. 5,869,205, U.S. Pat. No. 6,074,781 and U.S. Pat. No. 6,342,317. However, each of these references suffers from one or more of the following disadvantages, particularly for small diameter, small volume cells such as AAA/LR03 and AAAA/LR8D425 sizes.

Manufacture of cells is difficult when a current collector prong must extend into each of a plurality of like-polarity electrodes. This means that each current collector prong must be aligned with one of the plurality of electrodes, requiring orientation of both the cell and the current collector. In addition, when multiple current collector prongs are required, the volume of active materials must be reduced to allow for an increase in the total volume of the collector, compared to cell designs in which a single current collector prong will suffice.

When the shape of the electrode interface is not essentially a right cylinder (e.g., when there are radial projections), the separator can be difficult to insert because of irregular surfaces and small clearances. Typical separator materials (e.g., polymeric film and woven or non-woven paper or fabric) in strip or sheet form may not conform well to the surface of the cavity in the cathode. Even application of a spray-on separator to the interfacial surface of one of the electrodes can be difficult. Sharp corners and narrow recesses in the interfacial surface of the cathode can make it difficult to completely fill the cavities with anode material, especially at high manufacturing speeds. Active materials can be non-uniformly, therefore incompletely, consumed during discharge because the maximum distance from the electrode interface (and the opposite electrode) can vary considerably in different parts of both electrodes. Electrode lobes can be more fragile, resulting in damage during assembly and short circuits within the cells.

The relative increase in separator volume can be greater than the increase in anode and cathode volumes, at least partially offsetting increases in discharge capacity that could be achieved through improved discharge efficiency with decreases due to relative reductions in the amounts of active materials.

Another way to increase the discharge capacity of a battery is to increase the amount of active materials that are put into the cell. This can be difficult if the external dimensions of the battery are not increased, as may be the case when maximum dimensions are specified, as is often the case for standard battery types in various industry standards. Examples of this approach are found in U.S. Pat. Nos. 5,283,139 and 6,265,101. Each of these references suffers from the disadvantage that the maximum dimensions are maintained, limiting the amount of possible increase in the amount of active materials (and therefore the theoretical capacity) in the batteries.

Since it is often desirable to minimize the size of portable devices, it is likewise desirable to minimize the volume of the batteries that power those devices.

For the foregoing reasons there is a need for a cylindrical alkaline cell with increased theoretical capacity as well as increased discharge efficiency, while minimizing the increase in cell volume.

SUMMARY

We have developed an extended interfacial surface area cylindrical alkaline cell that minimizes the impact on overall cell volume by extending the length of the anode and cathode while maintaining the same anode and cathode diameters.

A first aspect of the invention is an alkaline battery cell that comprises a cylindrical cell container having a straight side wall, a closed bottom end, and an open top end; a positive electrode containing electrolytic manganese dioxide; a negative electrode containing zinc; a separator; an electrolyte comprising a potassium hydroxide solute in water; and a closing element closing the open end of the container and sealing the electrodes and electrolyte within the cell. The positive electrode has a hollow cylindrical shape and is disposed against the side wall and the bottom end of the container to form a cavity. The negative electrode is disposed within that cavity, and the separator is disposed between the negative electrode and both the positive electrode and the bottom of the container. The container straight side wall has an outside diameter of 7.3 to 14.5 mm, and the positive electrode has a height of 45.7 to 76.2 mm from the bottom of the container.

In embodiments of the invention, the container straight side wall diameter and positive electrode height are 9.0 to 10.5 mm and 53.4 to 68.6 mm, 7.3 to 8.3 and 45.7 to 61.2, and 13.1 to 14.5 mm and 58.4 to 76.2 mm, respectively.

A second aspect of the invention is an alkaline battery cell that comprises a cylindrical cell container having a straight side wall, a closed bottom end, and an open top end; a positive electrode containing electrolytic manganese dioxide; a negative electrode containing zinc; a separator; an electrolyte comprising a potassium hydroxide solute in water; and a closing element closing the open end of the container and sealing the electrodes and electrolyte within the cell. The positive electrode has a hollow cylindrical shape and is disposed against the side wall and the bottom end of the container to form a cavity. The negative electrode is disposed within that cavity, and the separator is disposed between the negative electrode and both the positive electrode and the bottom of the container. The container straight side wall has an outside diameter of outside diameter of 9.0 to 10.5 mm and the positive electrode has a height of 55.9 to 68.6 mm from the bottom of the container. The cell theoretical capacity is greater than 2500 mAh, the positive electrode has a surface for interfacing the negative electrode via the separator, and the interfacial surface has area greater than 12.0 cm², the positive electrode has a volume greater than 1.9 cm³, and the positive electrode further comprises graphite, and a weight ratio of electrolytic manganese dioxide to graphite is greater than 19:1.

These and other features, advantages and objects of the present invention will be further understood and appreciated by reference to the following specification, claims and accompanying drawings.

Unless otherwise specified, the following definitions and methods are used herein:

(1) "Solid materials" means materials that do not have significant solubility (i.e., less than 1 percent based on the weight of water) in aqueous KOH solution anywhere in the range from 20 to 50 percent KOH by weight.

(2) Solid materials content (i.e., percent solids and percent solids packing) can be determined by dividing the sum of the volumes of all of the solid materials in that electrode by the total volume of that electrode and multiplying the result by 100 percent.

(3) The volume of a solid material in an electrode can be determined by dividing the weight of that material by its real density, as determined by helium pychnometry or a comparable method.

(4) "Electrode porosity" means the volume percent of non-solid materials in the electrode and may be determined by dividing the sum of the volumes of non-solid materials (liquids, materials dissolved in the liquids, and entrapped gases) by the total volume of the electrode. When expressed as a percent, the porosity of an electrode is equal to 100% minus the volume percent solids of the electrode.

(5) "Electrode volume" means volume within the exterior surfaces of the electrode (anode or cathode).

(6) "Electrode interfacial surface" means the surface of an electrode that is adjacent to an electrode of opposite polarity. While the shapes and sizes of interfacial surfaces of adjacent electrodes are usually very similar to one another in order to most efficiently use the internal volume of the cell, one electrode may extend slightly beyond the other to prevent internal shorting and accommodate variability in manufacturing. The interfacial surface area is the area of the entire interfacial surface, including any portion thereof that may extend beyond the corresponding interfacial surface of the adjacent electrode.

(7) The theoretical capacity of an electrode is a calculated capacity in ampere hours (Ah) based on the specific capacity (capacities) (in Ah per gram) of the active material (materials) in the electrode, assuming that all of the active material (materials) reacts according to the nominal discharge reactions. Unless otherwise indicated or apparent, the specific capacity used herein for electrolytic manganese dioxide the specific capacity is 0.379 Ah/g, assuming that all of the manganese reacts to $Mn^{+2.67}$ (an average of about 1.33 electrons per Mn atom), and the specific capacity of zinc is 0.820 Ah/g. The theoretical capacity of a cell is equal to that of the lower capacity electrode (the limiting electrode). Alternatively, capacity can be expressed in milliamp hours (mAh).

(8) "Long AAA cell" is a cell that has a diameter that would be suitable for a cell used in a battery meeting the dimensional requirements of an LR03 battery as specified in American National Standard for Dry Cells and Batteries—Specifications, ANSI C18.1.

(9) "Long AAAA cell" is a cell that has a diameter that would be suitable for a cell used in a battery meeting the dimensional requirements of an LR8D425 battery as specified in American National Standard for Dry Cells and Batteries—Specifications, ANSI C18.1.

Unless otherwise specified herein, all disclosed characteristics and ranges are as determined at room temperature (20-25° C.).

DESCRIPTION

Figure 1:
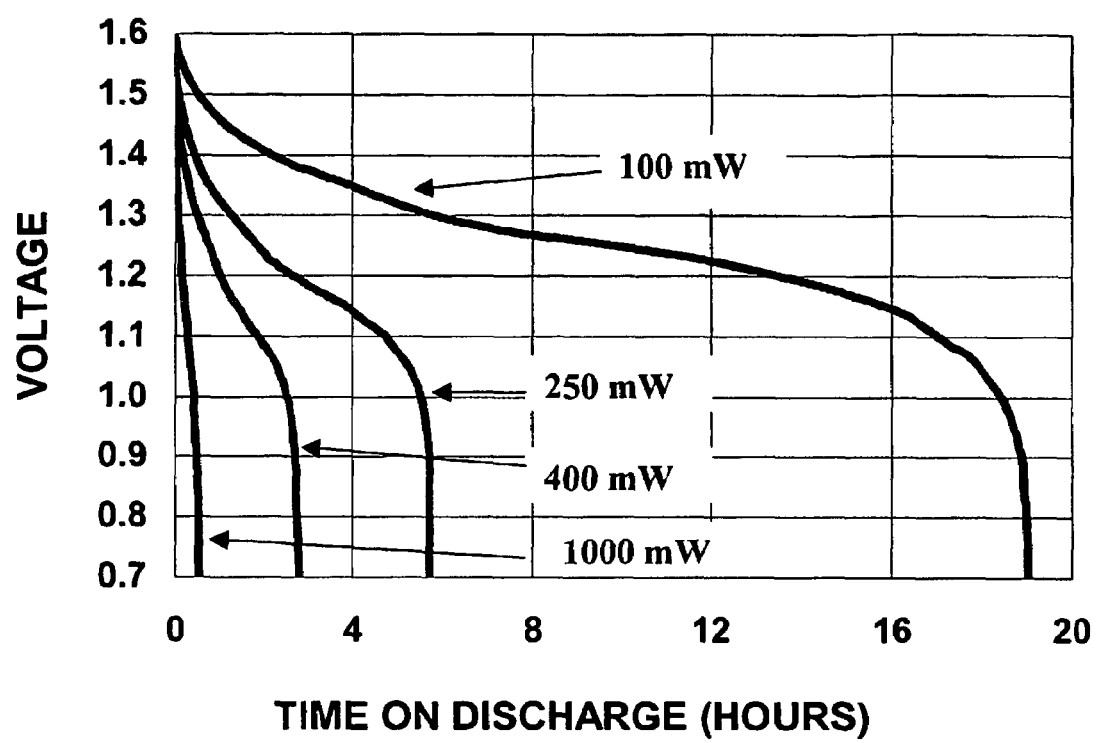
FIG. 1 shows average discharge curves (voltage vs. time on discharge) for long AAA cells on four constant power discharge tests.

The alkaline battery cell of the invention is a cell with increased discharge capacity. In the cell of the invention, both the internal volume and the electrode interfacial surface area are increased, without unnecessarily increasing the overall cell volume. For cells with a cylindrical anode surrounded by a cylindrical cathode (typical of standard cylindrical alkaline cells), such an increase can be achieved either by increasing the diameter of the cylindrical anode (and thereby also increasing the inner diameter of the surrounding cathode), increasing the length of the anode and cathode, or increasing both the diameter and length of the anode and cathode. All other factors remaining equal, interfacial surface area will increase in proportion to the increase in the aforementioned diameters and/or in proportion to the amount of the increase in the aforementioned lengths. For example, a 10% increase in the anode diameter of a cell with concentric cylindrical electrodes will result in a 10% increase in the electrode interfacial surface area. A 10% increase in the length of the anode and surrounding cathode will also result in a 10% increase in the interfacial surface area. Both of these solutions will increase the cell volume. However, a 10% increase in the length of the anode and surrounding cathode will result in an increase of at least 10% in total cell volume, while a 10% increase in the diameter of the anode will result in an increase of at least 21%. Thus, it is desirable to increase interfacial electrode surface area by only increasing the length of the anode and surrounding cathode, not the diameter, as the impact on overall cell volume is less than if the diameter were also increased.

The cell of the invention may have the same basic design and active materials as an existing cell, but with a longer cell container to accommodate the taller electrodes. LR03 and LR8D425 battery cells are cylindrical $Zn/MnO_2$ cells containing an aqueous alkaline electrolyte, normally having KOH as a solute. LR03 and LR8D425 cells can be modified as described above to produce long AAA and long AAAA cells, respectively. Alternatively, other cell features, such as seals, covers, current collectors, electrode compositions, electrolyte composition and the like, may also be modified.

EXAMPLE 1

Long AAA cylindrical alkaline cells were made with a diameter corresponding to the diameter of conventional LR03 cells and a height corresponding to 1.5 times the height of conventional LR03 cells. The cells had a bobbin-type construction. Each long AAA cell included a cylindrical steel can with closed bottom and open top ends, a cathode in the form of a hollow right cylinder formed against the inside surface of the can side wall, an anode disposed within the cavity formed by the inner surface of the cathode and the bottom of the can, a separator disposed between the anode and both the cathode and can bottom, and a seal and collector assembly closing the open end of the can.

The cell design principles set forth in United Kingdom patent application numbers GB 0015003.7, GB 0113990.6, GB 0113991.4 and GB 0120824.8 were followed. For example, the anode porosity was at least 69%, the cathode porosity was at least 26% and the electrolyte concentration was selected so that the final KOH concentration after a 1-electron discharge was between 49.5% and 51.5% (weight/weight cell).

Each cell contained 7.32 grams of cathode mixture, 4.31 grams of anode mixture and 1.04 grams of electrolyte solution and had a 5.0 volume percent void volume within the sealed cell.

Each cathode was made by forming cathode mixture into ring-shaped pellets, pushing 6 pellets into each can, with an interference fit between the pellets and can. A piece of coated separator paper was scrolled into a tube, folded into a basket shape and placed into the cavity formed by the cathode and can bottom. Anode gel mixture and free electrolyte were added to the cell. The cell was closed with a seal and collector assembly, with a pin-shaped current collector extending into the centrally disposed anode.

The cell cans were made in a conventional manner from conventional material cold-rolled steel strip, plated on the exterior surface with nickel. The cathode-contacting interior surfaces of the cans were coated with EB099, a graphite coating material available from Acheson Colloids Company, Port Huron, Mich., USA. The overall can height was 64 millimeters and the overall diameter was 10 millimeters.

The cathode mixture used in the Example 1 cells had a 23:1 ratio of EMD graphite and included Kerr McGee EMD (94.30 weight percent), Superior Graphite expanded graphite (4.10 weight percent) and 40 weight percent KOH in water (1.60 weight percent). Each cathode pellet weighed 1.22 grams had an outside diameter of 9.60 mm and a height of 9.80 mm before insertion and an inside diameter of 6.30 after insertion into the cans, resulting in a final cathode porosity of 30.0 volume percent.

The anode mixture had a 69.50 volume percent porosity and included 64.10 weight percent zinc powder (BIA 110, containing a Bi—In—Al zinc alloy and having a $d_{50}$ of 110 μm, from Umicore, Brussels, Belgium), 5.60 zinc flake (grade 5454.3, containing a Bi—In—Al zinc alloy, from Transmet Corp., Columbus, Ohio, USA), 0.38 weight percent gelling agent (CARBOPOL® 940 acrylic acid in 100% acid form from B. F. Goodrich Specialty Chemicals, Cleveland, Ohio, USA), 0.02 weight percent indium hydroxide, 0.04 weight percent zinc oxide, and 29.86 weight percent KOH solution consisting of 38 weight percent KOH in water.

The separator had 2 layers of VLZ75 separator paper (from Nippon Kodoshi Corp., Kochi-ken, Japan), coated to 30 grams/$m^2$ of poly (acrylic acid-co-sodium-4-styrene sulfonate), in a 20:80 ratio of acrylic acid:sodium styrene sulfonate, as disclosed in United Kingdom patent application number GB 0113989.8.

EXAMPLE 2

Long AAAA cylindrical alkaline cells were made with a diameter corresponding to the diameter of conventional LR8D425 cells and a height corresponding to 1.5 times the height of conventional LR8D425 cells. These cells were made in the same manner as disclosed for the cells in Example 1, except for the following.

Each cell contained 3.71 grams of cathode mixture, 1.80 grams of anode mixture and 0.90 gram of electrolyte solution and had a 3.5 volume percent void volume within the sealed cell.

The cell cans had an overall can height of 59.25 millimeters and an overall diameter of 7.6 millimeters.

Each cathode pellet weighed 0.62 gram had an outside diameter of 7.11 mm and a height of 8.50 mm before insertion and an inside diameter of 4.55 after insertion into the cans, resulting in a final cathode porosity of 29.0 volume percent.

The anode mixture had a 68.00 volume percent porosity and included 71.00 weight percent zinc powder, no zinc flake, 0.36 weight percent gelling agent, 0.02 weight percent indium hydroxide, 0.04 weight percent zinc oxide, and 28.58 weight percent KOH solution consisting of 38 weight percent KOH in water.

EXAMPLE 3

Samples were selected from available cylindrical alkaline LR8D425, LR03 and LR6 batteries for comparative discharge testing.

EXAMPLE 4

Cells from Examples 1, 2 and 3 were discharged under various constant power discharge regimens, as indicated in Tables 1 and 2, to 1.1 volts. The results are compared in Tables 1 and 2. In Table 1, discharge duration is shown in hours or minutes. In Table 2, discharge duration results are normalized to the LR03 cells on each test (i.e., 100% is the discharge duration of LR03 cells on a given test, and 150%, e.g., would be 150% times the discharge duration of LR03 cells on the same test).

TABLE 1

| Cell Type | Capacity (Ah) | 100 mW (hours) | 250 mW (hours) | 400 mW (hours) | 1000 mW (minutes) |
|---|---|---|---|---|---|
| LR8D425 | 0.7 | 4.0 | 0.6 | 0.3 | |
| Example 2 | 1.0 | 6.0 | 1.4 | 0.5 | |
| LR03 | 1.4 | 10.0 | 1.9 | 0.8 | 4 |
| Example 1 | 2.1 | 17.0 | 4.8 | 1.9 | 16 |
| LR6 | 3.0 | 26.0 | 6.9 | 2.7 | 22 |

TABLE 2

| Cell Type | Capacity (Ah) | 100 mW (%) | 250 mW (%) | 400 mW (%) | 1000 mW (%) |
|---|---|---|---|---|---|
| LR8D425 | 0.7 | 40 | 32 | 38 | |
| Example 2 | 1.0 | 60 | 74 | 62 | |
| LR03 | 1.4 | 100 | 100 | 100 | 100 |
| Example 1 | 2.1 | 170 | 253 | 238 | 400 |
| LR6 | 3.0 | 260 | 367 | 338 | 550 |

Typical discharge curves for long AAA cells from Example 1 on the constant power tests done in Example 4 are shown in FIG. 1, in which voltage on discharge is plotted over the time on discharge.

Figure 2:
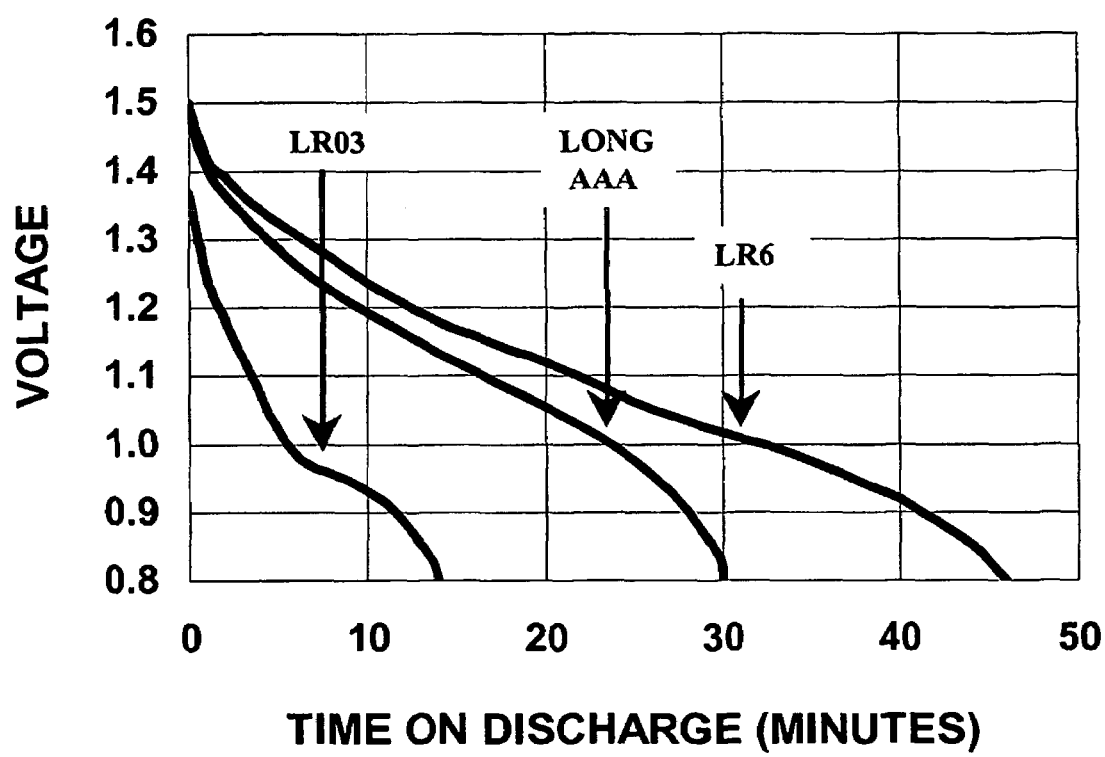
FIG. 2 shows average discharge curves for long AAA cells, LR03 cells and LR6 cells on a 1000 mW continuous discharge test.

FIG. 2 compares a typical discharge curve for Example 1 long AAA cells on the 1000 mW continuous discharge test with typical discharge curves for LR03 and LR6 cells from Example 3.

Figure 3:
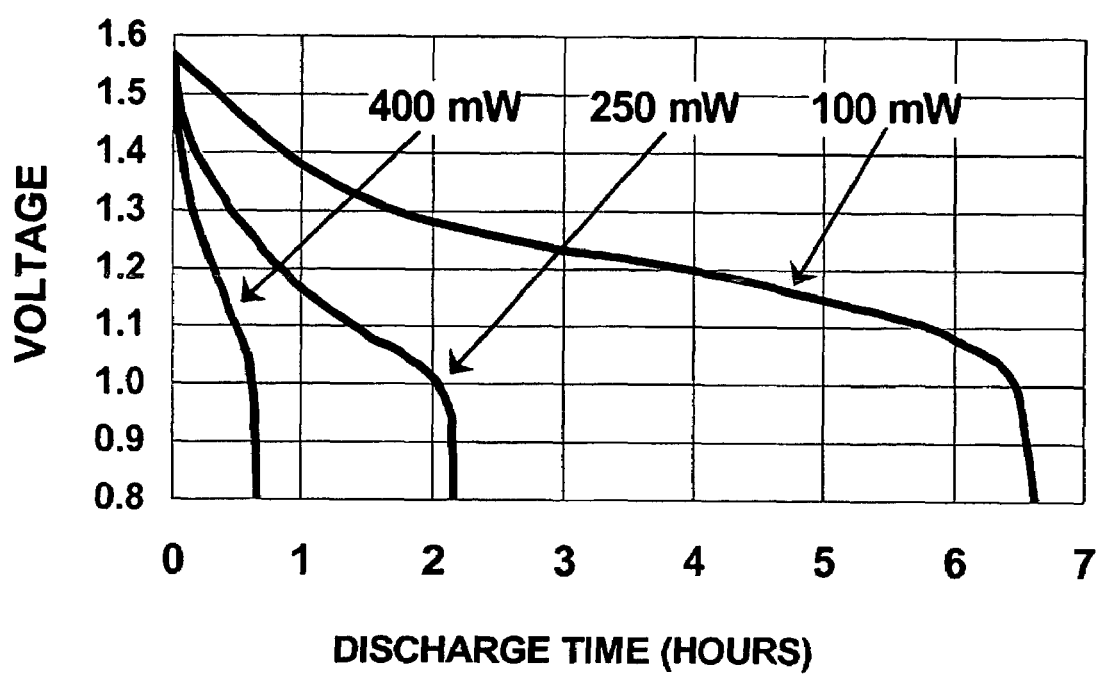
FIG. 3 shows average discharge curves for long AAAA cells on three constant power discharge tests.

Typical discharge curves for Example 2 long AAAA cells on the 100, 250 and 400 mW constant power tests are shown in FIG. 3.

From the results in Table 1, capacity (mWh) was calculated and plotted as a function of cell external volume. On each of the four tests, the long AAA cells 1 had higher average capacities than would be expected based on a straight-line interpolation between the data points for the LR03 and LR6 cells on the same tests. The average capacities of the long AAA cells were about 107%, 114%, 138% and 134% better than the interpolated capacities on the 100, 250, 400 and 1000 mW tests, respectively.

For long AAAA cells from Example 2, no capacity advantage relative to straight-line interpolations between LR8D425 and LR03 cells on a plot of capacity vs. total cell volume were observed. This may have been due to deficiencies in the long AAAA cells due to difficulties in assembling the long AAAA cells.

EXAMPLE 5

Long AAA cylindrical alkaline cells were made in accordance with the invention in the same manner as disclosed for the long AAA cells in Example 1, except as shown in Table 3. The quantities of all cell ingredients are based on the input amounts, and assuming there are no losses (e.g., water evaporation) during manufacturing. The cell design principles set forth in United Kingdom patent application numbers GB 0015003.7, GB 0113990.6, GB 0113991.4 and GB 0120824.8 were not necessarily followed in the long AAA cells in Example 5. The increases in active materials compared to the cells in Example 1 were possible in part by the use of a lower volume seal and collector assembly. The long AAA cell of Example 5 had a theoretical discharge capacity greater than 2500 mAh, a cathode interfacial surface area greater than 12.0 cm$^2$, a cathode volume greater than 1.9 cm$^3$, and a $MnO_2$:carbon weight ratio greater than 19:1.

TABLE 3

| Cell Parameter | Example 5 Long AAA | Example 6 LR03 | Example 6 LR6 |
|---|---|---|---|
| Cell content | | | |
| cathode mixture (g) | 8.00 | 5.00 | 11.12 |
| anode mixture (g) | 4.80 | 2.92 | 6.45 |
| electrolyte soln. (g of 40 wt % aq. KOH) | 0.88 | 0.63 | 0.125 |
| overall cell KOH concentration (wt %) | 32.57 | 31.97 | 33.93 |
| theor. capacity (mAh) based on anode | 2755 | 1676 | 3914 |
| Can characteristics | | | |
| outside diameter of can body (in./mm) | 0.393/9.98 | 0.393/9.98 | 0.547/13.89 |
| inside diameter below step (in./mm) | 0.377/9.58 | 0.377/9.58 | 0.527/13.39 |
| wall thickness below step (in./mm) | 0.008/0.20 | 0.008/0.20 | 0.010/0.25 |
| bottom thickness (in./mm) | 0.010/0.25 | 0.010/0.25 | 0.010/0.25 |
| graphite can coating material | Acheson LB1099 | Acheson LB1099 | Acheson LB1099 |
| Separator | | | |
| material | Freudenburg FS28224 | Freudenburg FS28224 | Freudenburg FS28224 |
| no. of layers | 2.44 | 2.17 | 2.14 |
| Cathode ring | | | |
| weight (g) | 1.33 | 1.25 | 2.78 |
| OD before insertion (in./mm) | 0.377/9.58 | 0.377/9.58 | 0.527/13.39 |
| ID before insertion (in./mm) | 0.2575/6.54 | 0.258/6.55 | 0.350/8.89 |
| height before insertion (in./mm) | 0.405/10.29 | 0.377/9.58 | 0.421/10.69 |
| no. per cell | 6 | 4 | 4 |
| Formed cathode | | | |
| ID (in./mm) | 0.2575/6.54 | 0.258/6.55 | 0.350/8.89 |
| height (in./mm) | 2.405/61.09 | 1.501/38.13 | 1.667/42.34 |

TABLE 3-continued

| Cell Parameter | Example 5 Long AAA | Example 6 LR03 | Example 6 LR6 |
|---|---|---|---|
| interfacial surf. area (in.$^2$/cm$^2$) | 1.945/12.55 | 1.215/7.84 | 1.831/11.81 |
| volume (in.$^3$/cm$^3$) | 0.125/2.053 | 0.078/1.284 | 0.160/2.626 |
| solids packing (vol. %) | 78.01 | 79.33 | 76.60 |
| Cathode mixture | | | |
| EMD (wt %) | 90.96 | 91.17 | 90.96 |
| expanded graphite (wt %) | 4.49 | 4.86 | 4.49 |
| Nb-doped TiO$_2$ (wt %) | 0.39 | 0.40 | 0.40 |
| polyethylene binder (wt %) | 0.44 | 0.45 | 0.44 |
| KOH solution amount (wt %) | 3.72 | 3.13 | 3.72 |
| KOH conc. in solution (wt %) | 40 | 40 | 40 |
| MnO$_2$: C (by weight) | 20.3 | 18.8 | 20.3 |
| Anode mixture | | | |
| Zn powder (wt %) | 67.00 | 67.00 | 68.00 |
| Zn flake (wt %) | 3.00 | 3.00 | 2.40 |
| Carbopol 940 (wt %) | 0.479 | 0.460 | 0.445 |
| ZnO (wt %) | 0.976 | 0.936 | 0.906 |
| KOH solution amount (wt %) | 32.52 | 31.20 | 30.19 |
| KOH conc. in solution (wt %) | 32.00 | 32.00 | 36.00 |
| sodium silicate (wt %) | 0.098 | 0.094 | 0.091 |
| Electrolyte additions | | | |
| KOH solution amount (g) | 0.88 | 0.63 | 1.25 |
| KOH conc. in solution (wt %) | 36.5 | 36.5 | 36.5 |

EXAMPLE 6

Batteries with parameters closest to those of the Example 5 long AAA cells were selected from LR03 and LR6 cells that were available. Table 3 above includes key parameters of these LR03 and LR6 cells.

EXAMPLE 7

Cells from Examples 5 and 6 were tested at 21° C. (70° F.) on several continuous constant current and constant power discharge tests. Average capacities to 1.0 volt are summarized in Table 4.

TABLE 4

| | Discharge Capacity | | |
|---|---|---|---|
| Test | Example 5 Long AAA | Example 6 LR03 | Example 6 LR6 |
| 1500 mA continuous | 394.7 mAh | 161.0 mAh | 478.3 mAh |
| 1000 mA continuous | 557.4 mAh | 273.6 mAh | 707.0 mAh |
| 500 mA continuous | 818.2 mAh | 432.4 mAh | 1100.3 mAh |
| 250 mA continuous | 1132.7 mAh | 671.2 mAh | 1711.9 mAh |
| 100 mA continuous | 1650.3 mAh | 998.2 mAh | 2265.8 mAh |
| 1000 mW continuous | 555.1 mWh | 269.8 mWh | 653.5 mWh |
| 400 mW continuous | 1022.8 mWh | 534.0 mWh | 1310.0 mWh |
| 250 mW continuous | 1281.3 mWh | 702.3 mWh | 1741.6 mWh |
| 100 mA continuous | 1695.1 mWh | 1000.2 mWh | 2278.4 mWh |

EXAMPLE 8

Using the results of the testing in Example 7, long AAA cell discharge capacity (mWh) on constant power discharge, as a function of both total cell volume and cathode volume, was compared to discharge capacities of the LR03 and LR6 cells according to the Interpolation Method below. As shown in Table 5, the discharge capacity of the long AAA cell is greater than would be expected on each test, based on straight-line interpolations between the LR03 and LR6 results.

The results in Table 5 are consistent with those described in Example 4 above, with actual capacities exceeding those that would be expected based on straight-interpolations between data points for cell types with larger and smaller volumes than the long AAA cells. This is true whether a plot of capacity vs. total cell volume or capacity vs. cathode volume is used. There is also a direct correlation between the magnitude of this advantage and increasing constant discharge power.

TABLE 5

| Test | Graph Used: Capacity vs. — | Interpolated Capacity (mWh) | Actual Capacity (mWh) | Actual Capacity (% of interpolated capacity) |
|---|---|---|---|---|
| 1000 mW cont. | Total Volume | 475 | 555 | 117% |
| 400 mW cont. | Total Volume | 870 | 1023 | 118% |
| 250 mW cont. | Total Volume | 1150 | 1281 | 111% |
| 100 mW cont. | Total Volume | 1540 | 1695 | 110% |
| 1000 mW cont. | Cathode Volume | 460 | 555 | 121% |
| 400 mW cont. | Cathode Volume | 915 | 1023 | 112% |
| 250 mW cont. | Cathode Volume | 1215 | 1281 | 105% |
| 100 mW cont. | Cathode Volume | 1630 | 1695 | 104% |

INTERPOLATION METHOD (1) A tall cell and two comparative cells are selected according to the following criteria:

(a) each cell type has a cylindrical container with coaxial positive and negative electrodes, a separator between the electrodes, an electrolyte, and a closing element; the positive electrode comprises electrolytic manganese dioxide, has a hollow cylindrical shape, and is formed against the container body side wall and bottom to form a cavity within the cylinder; the negative electrode comprises zinc and is disposed within the cavity formed by the positive electrode and the container bottom; the electrolyte comprises a potassium hydroxide solute in water; and the closing element closes the open end of the container and seals the electrodes and electrolyte within the cell;

(b) in all cell types the cathode mixtures contain the same types of materials; excluding water and KOH, the ratio of weight percent electrolytic manganese dioxide in the cathode mixture of the tall cell to that in each of the comparative cells is within the range 0.99:1 to 1.01:1, and excluding water and KOH, the ratio of weight percent of each other ingredient in the cathode mixture of the tall cell to that in each of the comparative cells is within the range 0.90:1 to 1.10:1;

(c) in all cell types the anode mixtures contain the same types of materials; excluding water and KOH, the ratio of weight percent of total zinc in the tall cell to that in each of the comparative cells is within the range 0.99:1 to 1.01:1, and excluding water and KOH, the ratio of weight percent of each other ingredient in the tall cell to that in each of the comparative cells is within the range 0.90:1 to 1.10:1;

(d) the ratio of the percent of total water (as a weight percent of the sum of the anode mixture, cathode mixture, KOH solution and water) in the tall cell to that in each of the other cells is within the range 0.98:1 to 1.02:1, and the ratio of overall KOH concentration (as a weight percent of the total KOH and water) in the tall cell to that of each of the comparative cells is within the range 0.95:1 to 1.05:1, assuming no water loss during cell manufacturing; and (e) each cell type has the same type of separator material, and the ratio of separator volume ($cm^3$) per cathode interfacial surface area ($cm^2$) for the tall cell to that of each of the comparative cells is within the range 0.99:1 to 1.01:1;

(2) discharge at least one cell of each type continuously at 1000 mW to 1.0 volt at room temperature and determine an actual discharge capacity in mWh for each type;

(3) plot a data point representing an average for each cell type on a graph with discharge time on the x-axis and one of total cell volume and cathode volume on the y-axis;

(3) draw a straight line between the data points for the comparative cell types;

(4) on the straight line, find the point corresponding to the volume of the tall cell type and determine the corresponding interpolated tall cell discharge capacity on the y-axis; and (5) compare the interpolated discharge capacity from step (4) with the tall cell actual discharge capacity from step (2).

LR03 battery cell containers may have diameters ranging from 0.359 to 0.413 inch (9.0 to 10.5 mm) depending in part on the thickness of any jacket that may be applied around the cylindrical container. Similar advantages might also be seen in cylindrical alkaline cells having other diameters, such as long AAAA cells (container diameters from 0.288 to 0.327 inch (7.3 to 8.3 mm)), long AA cells (container diameters from 0.516 to 0.571 inch (13.1 to 14.5 mm), and others. Accordingly, long battery cell container diameters can range from about 0.288 to 0.571 inch (14.5 mm).

Long cell cathode heights can range from about 1.4 to 1.8 times the cathode heights of conventional cells of the same diameters, the higher cathode heights being preferred when, for example, the cell closing element volume can be reduced to allow more space for active materials. For LR8D425, LR03 and LR6 diameters, this includes a range of about 1.8 to 3.0 inches (45.7 to 76.2 mm) for the corresponding long cells, or about 1.8 to 2.7 inches (45.7 to 68.6 mm) for long cells with LR8D425 and LR03 diameters. A long AAA cell can have a cathode height of about 2.1 to 2.7 inches (53.4 to 68.6 mm), and under certain conditions preferably at least 2.2 or 2.4 inches (55.9 or 61.0 mm). A long AAAA cell can have a cathode height of about 1.8 to 2.4 inches (45.7 to 61.2 mm), preferably at least 2.0 inches (50.8 mm). A long AA cell can have a cathode height of about 2.3 to 3.0 inches (58.4 to 76.2 mm), preferably at least 2.5 inches (63.5 mm).

Further improvements in cell discharge performance can also be made by changing other cell features that do not increase the diameter of the cell container. For example, the volume of inert cell components (e.g., cell container, closing element, current collectors, and separator) can be reduced, making more internal volume available for active materials. The formulations of electrodes and electrolyte can be changed to improve theoretical capacity and/or discharge efficiency. The electrode ingredients (e.g., types and relative quantities of manganese dioxide, graphite or other conductive material, binder, zinc, anode gellant, potassium hydroxide and various electrode additives) can be changed to give better discharge performance. Current collector materials, shapes, sizes and coatings can also be changed, as can the shapes of the electrodes.

It may also be possible to achieve similar benefits in cells having different electrochemical systems (active materials and electrolytes) and different shapes (e.g., prismatic cells).

Although the present invention has been described in considerable detail with reference to certain preferred versions thereof, other versions are possible, and examples are disclosed above.

The claimed invention is:

1. An alkaline battery cell comprising:
   a cylindrical cell container comprising a straight side wall, a closed bottom end, and an open top end;
   a positive electrode comprising electrolytic manganese dioxide, a negative electrode comprising zinc, a separator, and an electrolyte comprising a potassium hydroxide solute in water disposed inside the container;
   a closing element closing the open end of the container and sealing the electrodes and electrolyte within the cell;
   wherein:
   the positive electrode has a hollow cylindrical shape and is disposed against the side wall and the bottom end of the container to form a cavity within the hollow cylinder, the negative electrode is disposed within the cavity in the positive electrode, and the separator is disposed between the negative electrode and both the positive electrode and the bottom of the container;
   the container straight side wall has an outside diameter of 7.3 to 14.5 mm; and
   the positive electrode has a height of 45.7 to 76.2 mm from the bottom of the container.

2. The cell according to claim 1, wherein the container outside diameter is 9.0 to 10.5 mm and the positive electrode height is 53.4 to 68.6 mm.

3. The cell according to claim 2, wherein the positive electrode height is at least 55.9 mm.

4. The cell according to claim 3, wherein the positive electrode height is at least 61.0 mm.

5. The cell according to claim 2, wherein the theoretical cell capacity is greater than 2500 mAh.

6. The cell according to claim 5, wherein the positive electrode has a surface for interfacing the negative electrode via the separator, and the interfacial surface has area greater than 12.0 $cm^2$.

7. The cell according to claim 6, wherein the volume of the positive electrode is greater than 1.9 $cm^3$.

8. The cell according to claim 2, wherein the positive electrode further comprises graphite, and a weight ratio of electrolytic manganese dioxide to graphite is greater than 19:1.

9. The cell according to claim 2, wherein the total potassium hydroxide concentration in the cell prior to discharge, based on the total amounts of potassium hydroxide and water, is such that the calculated potassium hydroxide concentration is between 49.5 and 51.5 percent (w/w solution) if the cell were discharged to reduce the manganese in the manganese dioxide to $Mn^{+3}$.

10. The cell according to claim 1, wherein the container outside diameter is 7.3 to 8.3 mm and the positive electrode height is 45.7 to 68.6 mm.

11. The cell according to claim 10, wherein the positive electrode height is at least 50.8 mm.

12. The cell according to claim 1, wherein the container outside diameter is 13.1 to 14.5 mm and the positive electrode height is 58.4 to 76.2 mm.

13. The cell according to claim 12, wherein the positive electrode height is at least 63.5 mm.

14. An alkaline battery cell comprising:
a cylindrical cell container comprising a side wall, a closed bottom end, and an open top end;
a positive electrode comprising electrolytic manganese dioxide, a negative electrode comprising zinc, a separator, and an electrolyte comprising a potassium hydroxide solute in water disposed inside the container;
a closing element closing the open end of the container and sealing the electrodes and electrolyte within the cell;
wherein:
the positive electrode has a hollow cylindrical shape, disposed against the side wall and the bottom end of the container to form a cavity within the hollow cylinder, negative electrode is disposed within the cavity in the positive electrode, and the separator is disposed between the negative electrode and both the positive electrode and the bottom of the container;
the container has an outside diameter of 9.0 to 10.5 mm;
the positive electrode has a height of 55.9 to 68.6 mm from the bottom of the container;
the cell theoretical capacity is greater than 2500 mAh;
the positive electrode has a surface for interfacing the negative electrode via the separator, and the interfacial surface has area greater than 12.0 cm²;
the positive electrode has a volume greater than 1.9 cm³; and
the positive electrode further comprises graphite, and a weight ratio of electrolytic manganese dioxide to graphite is greater than 19:1.

15. An alkaline battery cell comprising:
a cylindrical cell container comprising a straight side wall, a closed bottom end, and an open top end;
a positive electrode comprising electrolytic manganese dioxide, a negative electrode comprising zinc, a separator, and an electrolyte comprising a potassium hydroxide solute in water disposed inside the container;
a closing element closing the open end of the container and sealing the electrodes and electrolyte within the cell;
wherein:
the positive electrode has a hollow cylindrical shape and is disposed against the side wall and the bottom end of the container to form a cavity within the hollow cylinder, the negative electrode is disposed within the cavity in the positive electrode, and the separator is disposed between the negative electrode and both the positive electrode and the bottom of the container;
the container straight side wall has an outside diameter of 9.0 to 10.5 mm;
the positive electrode has a height of 53.4 to 68.6 mm from the bottom of the container; and
the cell has an actual discharge capacity in milliwatt-hours that is at least 110 percent of an interpolated cell discharge capacity, when interpolated from discharge testing of an LR03 cell and an LR6 cell according to an interpolation method.

16. The cell according to claim 15, wherein the positive electrode has a surface for interfacing the negative electrode via the separator, and the interfacial surface has area greater than 12.0 cm².

17. The cell according to claim 16, wherein the volume of the positive electrode is greater than 1.9 cm³.

18. The cell according to claim 17, wherein the positive electrode height is at least 55.9 mm.

19. The cell according to claim 18, wherein the positive electrode height is at least 61.0 mm.

* * * * *